May 24, 1932.    W. R. SMITTLE    1,860,267

PACKING RING

Filed Feb. 18, 1931

Inventor

Walter R. Smittle

By Clarence A. O'Brien
Attorney

Patented May 24, 1932

1,860,267

UNITED STATES PATENT OFFICE

WALTER R. SMITTLE, OF ST. LOUIS, MISSOURI

PACKING RING

Application filed February 18, 1931. Serial No. 516,816.

This invention relates to a packing, the general object of the invention being to make the packing of inner and outer sectional rings with a spring engaging the inner circumference of the inner ring, so that this spring and the pressure of the fluid passing through the pipe joints or other rotatable joints, will press the parts of the packing outwardly, thereby making the packing tight without the aid of adjustment.

Another object of the invention is to provide the sections of the ring with interlocking parts to prevent the rings from floating, thus eliminating the danger of the openings between the sections coming together, which would cause a leak.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
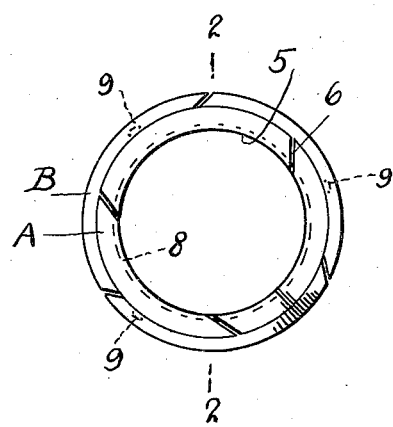
Figure 1 is an elevation of the improved packing device.
Figure 3:
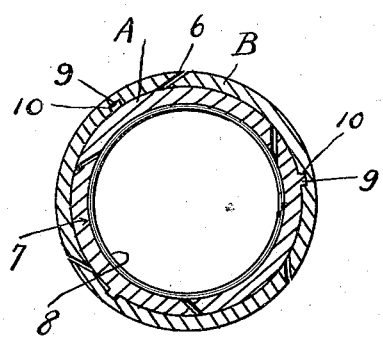
Fig. 3 is a section on the line 3—3 of Fig. 2.
Figure 2:
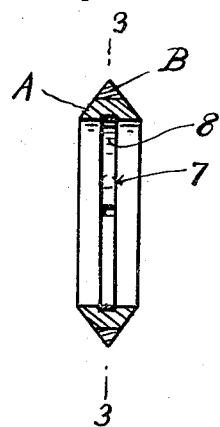
Fig. 2 is a section on the line 2—2 of Fig. 1.

In this drawing, the letter A indicates a sectional ring and the letter B the outer sectional ring. These rings when placed together form a packing ring of substantially triangular shape in cross section as shown in Fig. 2, so that the rings can be placed in a pipe joint or other rotatable joint, and the two rings are formed of sections 5, and the pressure of the fluid passing through the joints will act to press the parts outwardly so as to keep the packing tight without the aid of adjustment.

Figure 4:
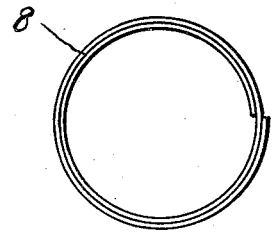
Fig. 4 is a view of the spring which acts to press the parts outwardly.

The ends of the sections are beveled as shown at 6 with the ends of one section having a sliding engagement with the beveled ends of adjacent sections. The inner ring A has a circumferential groove 7 on its inner circumference for receiving a spring 8 which is formed of a long strip of spring material which is given a number of turns as shown in Fig. 4. This spring tends to hold the packing in position and to force the parts outwardly.

The sections of the inner ring are formed with the projections 9 which engage recesses 10 formed in the sections of the outer ring, so that said projections and recesses act to keep the rings from floating and thus eliminate the danger of the openings in the rings coming together which would cause leakage.

It is though from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A triangular shaped packing member composed of inner and outer rings, the inner ring having side walls sloping toward each other from the inner circumference and a flat outer circumference, the outer ring being of triangular shape in cross section and seated on the flat outer circumference of the inner ring, the two outer sides of the outer ring forming continuations of the sloping sides of the inner ring, each ring being formed of a number of sections, the sections having bevelled ends and the inner ring having an inner circumferential groove therein and an expanding spring located in the groove and formed of a number of convolutions located in the groove and arranged one upon another circumferentially, the sections of one ring having recesses therein and the sections of said other ring having projections for entering the recesses to prevent circumferential movement of one ring with relation to the other.

In testimony whereof I affix my signature.

WALTER R. SMITTLE.